(12) United States Patent
Yamagishi et al.

(10) Patent No.: US 7,303,615 B2
(45) Date of Patent: Dec. 4, 2007

(54) COLORANT MATERIAL, AND WATER DISPERSION, INK, INK TANK, RECORDING UNIT, RECORDING APPARATUS AND RECORDING METHOD USING THE SAME

(75) Inventors: Yuko Yamagishi, Tokyo (JP); Yasuaki Murai, Kawasaki (JP); Takeshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 11/063,592

(22) Filed: Feb. 24, 2005

(65) Prior Publication Data

US 2005/0188894 A1 Sep. 1, 2005

(30) Foreign Application Priority Data

Feb. 27, 2004 (JP) ............... 2004-055256

(51) Int. Cl.
*C09D 11/00* (2006.01)
*C09D 11/02* (2006.01)
*B41J 2/01* (2006.01)

(52) U.S. Cl. .............. 106/31.43; 106/31.46; 106/31.47; 106/31.49; 106/31.75; 106/31.76; 106/31.77; 106/31.78; 347/100

(58) Field of Classification Search ............. 106/31.43, 106/31.46, 31.47, 31.49, 31.75, 31.76, 31.77, 106/31.78; 552/301; 347/100
See application file for complete search history.

(56) References Cited

U.S. PATENT DOCUMENTS 4,656,121 A * 4/1987 Sato et al. ............. 430/270.19

(Continued)

FOREIGN PATENT DOCUMENTS

JP 11-170686 6/1999

(Continued)

OTHER PUBLICATIONS

English translation of JP 2001/064554; Mar. 2001.*

(Continued)

*Primary Examiner*—Helene Klemanski
(74) *Attorney, Agent, or Firm*—Fitzpatrick, Cella, Harper & Scinto

(57) ABSTRACT

There is provided a colorant material comprising a compound represented by at least one of the following general formulas (1) and (2) as a first colorant compound and at least one of a water insoluble triphenylmethane compound and a water insoluble xanthene compound as a second colorant compound 14 Claims, 3 Drawing Sheets

U.S. PATENT DOCUMENTS

| | | | |
|---|---|---|---|
| 4,699,863 A * | 10/1987 | Sawatari et al. | 430/97 |
| 4,923,390 A * | 5/1990 | Oguchi et al. | 430/270.19 |
| 5,492,792 A * | 2/1996 | Tamura et al. | 430/270.15 |
| 6,508,872 B2 | 1/2003 | Nguyen et al. | 106/31.47 |
| 6,676,735 B2 | 1/2004 | Oki et al. | 106/31.46 |
| 6,921,433 B2 | 7/2005 | Kuribayashi et al. | 106/499 |
| 2003/0010251 A1* | 1/2003 | Woosman et al. | 106/31.27 |
| 2004/0244642 A1 | 12/2004 | Uji et al. | 106/31.28 |
| 2005/0148786 A1* | 7/2005 | Ikeda et al. | 552/301 |
| 2005/0178289 A1 | 8/2005 | Murai et al. | 106/31.43 |
| 2006/0197815 A1* | 9/2006 | Yamagishi et al. | 347/100 |
| 2006/0257760 A1* | 11/2006 | Mori et al. | 430/7 |
| 2007/0055071 A1* | 3/2007 | Kimura et al. | 552/301 |

FOREIGN PATENT DOCUMENTS

| | | |
|---|---|---|
| JP | 2000-327941 | 11/2000 |
| JP | 2001-64554 | 3/2001 |
| JP | 2002-317135 | 10/2002 |
| JP | 2002-348512 | 12/2002 |

OTHER PUBLICATIONS

English translation of JP 2000/327941; Nov. 2000.*
Formula of Pigment Blue 3 from the Registry file in STN; Nov. 1984.*

* cited by examiner

COLORANT MATERIAL, AND WATER DISPERSION, INK, INK TANK, RECORDING UNIT, RECORDING APPARATUS AND RECORDING METHOD USING THE SAME

BACKGROUND OF THE INVENTION

1. Field of the Invention

The present invention relates to a colorant material containing two or more types of organic colorant compounds, and a water dispersion and an ink containing the colorant material, an ink tank, a recording unit, a recording apparatus and a recording method using such a water dispersion and ink. The water dispersion can be used as a recording material.

2. Related Background Art

As life style has been changed with the progress of science and technology, colorants (also called "color materials") have been not only used as conventional coloring agents for materials such as fibers, plastics and leather but also used in various industrial fields by taking an advantage of the feature of the colorant suitable for data recording or data display. With rapid spread of personal computers in recent years, hard copy technique represented by ink-jet printing has been developed in order to record (print) letters and image data output from the computers.

The ink-jet printing technique has been developed, with the result that it exceeds silver halide photograph in terms of image quality; however, the stability of images with time is not yet sufficient. As color materials for use in ink-jet ink, dyes or pigments are used. In the former case, a highly accurate image in quality can be provided; however, storage stability is poor. In the latter case, a relatively good image can be obtained in view of weather resistance; however, a color reproduction range is narrow and thus its image quality is usually poorer than that obtained by dye-based ink. Color fading of these color materials is conceivably caused by light, moisture, and activated gases in the environment such as ozone. In these circumstances, it has been desired to develop a novel color material excellent in fastness having a high weather resistance.

As means for improving light fastness of an image obtained by ink-jet ink, various methods have been proposed in which additives such as an ultraviolet absorbent, light stabilizer and antioxidant are used in order to give functionality to the ink (see Japanese Patent Application Laid-Open Nos. H11-170686, 2002-317135 and 2002-348512). Unfortunately, although weather resistance (light fastness) is improved by any method, its effect is not always sufficient. This is considered that since additives are not present in the proximity of colorants, the ink is not sufficiently functionalized by the additives and the effect of the additives are not produced well.

An attempt to improve the light fastness of an image obtained by ink has been made by use of a water-soluble liquid composition that is composed of an oil-soluble additive and a water-soluble dye (see Japanese Patent Application Laid-Open Nos. 2000-327941 and 2001-64554). However, this method has a problem in that the compatibility between the oil soluble additive and the water-soluble dye is not sufficient, and therefore usually has a limited effect.

SUMMARY OF THE INVENTION

An object of the present invention is to provide a colorant material capable of forming a high definition color image excellent in fastness as a recording material for use in hard copy, typically, ink-jet printing, and provide a water dispersion using the colorant.

Another object of the present invention is to provide an ink containing the aforementioned colorant material, and ink tank, recording unit, recording apparatus and recording method using such ink.

These objects can be attained by providing a colorant material according to the present invention. More specifically, the present invention is directed to the colorant material characterized by comprising a compound represented by at least one of the following general formulas (1) and (2) as a first colorant compound and at least one of a water insoluble triphenylmethane compound and a water insoluble xanthene compound as a second colorant compound.

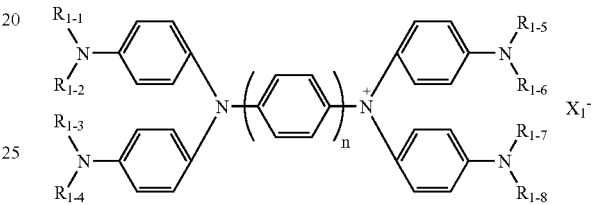

(1)

wherein $R_{1-1}$ to $R_{1-8}$ each represent a hydrogen atom, an alkyl group having 1 to 8 carbon atoms, an alkenyl group having 1 to 8 carbon atoms, an alkynyl group having 1 to 8 carbon atoms, or an aralkyl group; or, of $R_{1-1}$ to $R_{1-8}$, two groups attaching to the same nitrogen atom may bond to each other to form a 5-membered ring, 6-membered ring or 7-membered ring together with the nitrogen atom and wherein $R_{1-1}$ to $R_{1-8}$ may have substituents; and $R_{1-1}$ to $R_{1-8}$ and their substituents may be the same or different; any aromatic ring in the formula may have a further substituent; n is 1 or 2; and $X_1^-$ represents an anion; and

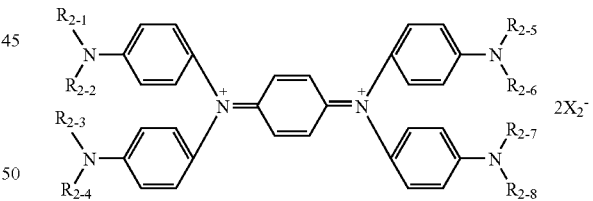

(2)

wherein $R_{2-1}$ to $R_{2-8}$ each represent a hydrogen atom, an alkyl group having 1 to 8 carbon atoms, an alkenyl group having 1 to 8 carbon atoms, an alkynyl group having 1 to 8 carbon atoms, or an aralkyl group; or, of $R_{2-1}$ to $R_{2-8}$, two groups attaching to the same nitrogen atom may bond to each other to form a 5-membered ring, 6-membered ring or 7-membered ring together with the nitrogen atom and wherein $R_{2-1}$ to $R_{2-8}$ may have substituents; and $R_{2-1}$ to $R_{2-8}$ and their substituents may be the same or different; any aromatic ring in the formula may have a further substituent; and $X_2^-$ represents an anion.

Furthermore, the present invention is directed to a water dispersion characterized by comprising the aforementioned colorant material.

Moreover, the present invention is directed to an ink containing the aforementioned colorant material, and an ink tank, a recording unit, a recording apparatus and a recording method using such ink.

Use of a water dispersion containing a colorant material according to the present invention as ink-jet ink makes it possible to provide a high definition printed matter (such as color image) excellent in fastness, in particular, weather resistance (light fastness).

DESCRIPTION OF THE PREFERRED EMBODIMENTS

Figure 1:
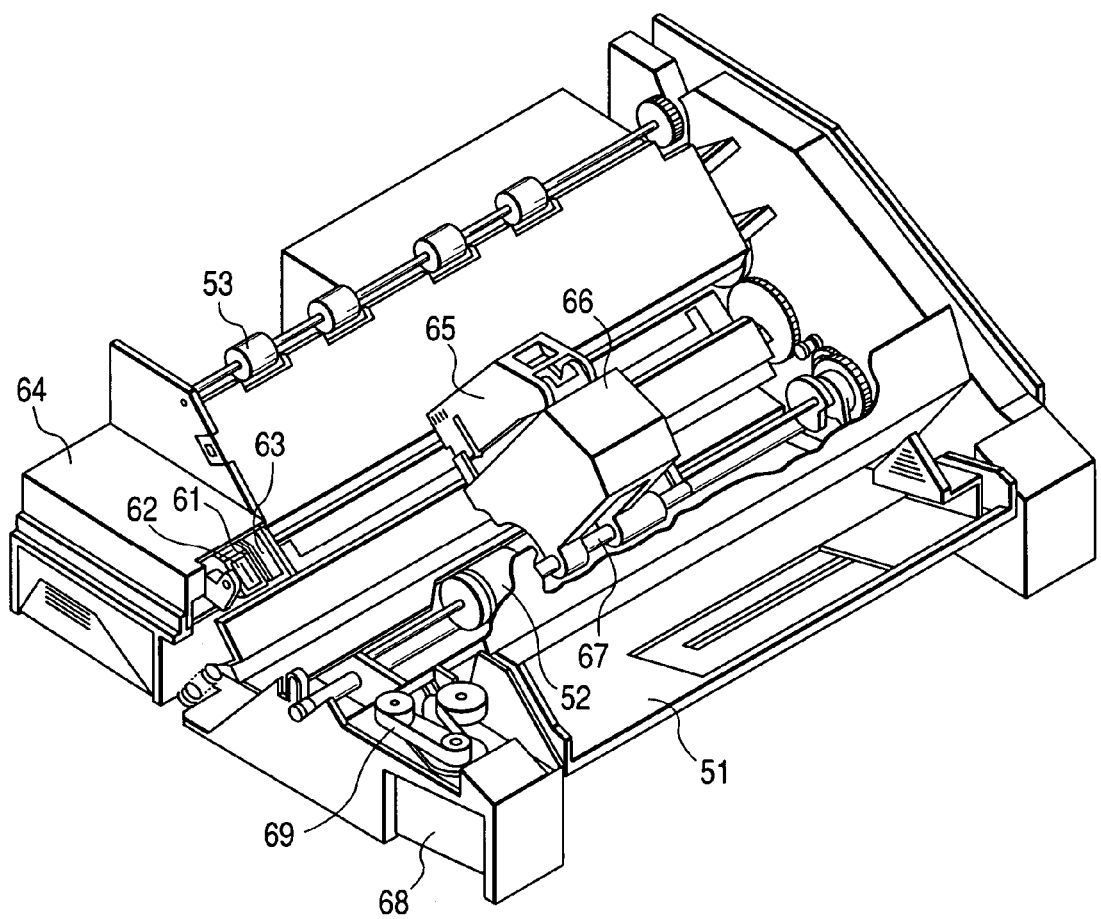
FIG. 1 is a perspective view of an ink-jet recording apparatus.

The present invention will be more specifically described by way of preferred embodiments for carrying out the invention. The "colorant material" used herein is a mixture form in which a first colorant compound and a second colorant compound are dispersed and mixed microscopically or macroscopically, and more preferably, is a mixture form in which they are mixed in a molecular level.

First, the first colorant compound to be contained in a colorant material according to the present invention and represented by at least one of the following general formulas (1) and (2) will be described in detail.

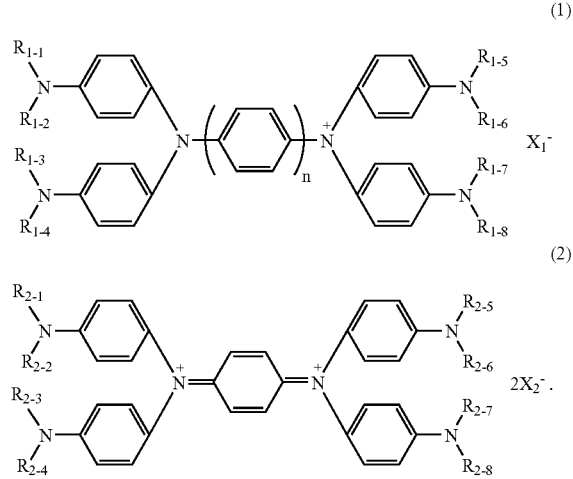

In the general formulas (1) and (2) above, $R_{1-1}$ to $R_{1-8}$ and $R_{2-1}$ to $R_{2-8}$ each represent a hydrogen atom, an alkyl group having 1 to 8 carbon atoms, an alkenyl group having 1 to 8 carbon atoms, an alkynyl group having 1 to 8 carbon atoms, or an aralkyl group. $R_{1-1}$ to $R_{1-8}$ and $R_{2-1}$ to $R_{2-8}$ may have substituents. $R_{1-1}$ to $R_{1-8}$ and $R_{2-1}$ to $R_{2-8}$ and their substituents may be the same or different.

Examples of such alkyl group having 1 to 8 carbon atoms of $R_{1-1}$ to $R_{1-8}$ and $R_{2-1}$ to $R_{2-8}$ include a methyl group, ethyl group, n-propyl group, isopropyl group, n-butyl group, sec-butyl group, isobutyl group, tert-butyl group, n-amyl group, n-hexyl group, n-octyl group, and tert-octyl group.

Examples of such alkenyl group having 1 to 8 carbon atoms of $R_{1-1}$ to $R_{1-8}$ and $R_{2-1}$ to $R_{2-8}$ include a vinyl group, propenyl group, butenyl group, pentenyl group, hexenyl group, heptenyl group, and octanyl group.

Examples of such alkynyl group having 1 to 8 carbon atoms of $R_{1-1}$ to $R_{1-8}$ and $R_{2-1}$ to $R_{2-8}$ include a propynyl group, butynyl group, pentynyl group, and hexynyl group.

Examples of such aralkyl group of $R_{1-1}$ to $R_{1-8}$ and $R_{2-1}$ to $R_{2-8}$ include a benzyl group, 2-phenylethyl group, 3-phenylpropyl group, α-naphthylmethyl group, and β-naphthylethyl group.

Of $R_{1-1}$ to $R_{1-8}$ and $R_{2-1}$ to $R_{2-8}$, two groups attaching to the same nitrogen atom may bond to each other to form a 5-membered ring, 6-membered ring or 7-membered ring, with a nitrogen atom. To be more specific, a 5-membered ring, 6-membered ring or 7-membered ring may be formed by mutual bonding of any one of the combinations of $R_{1-1}$ and $R_{1-2}$; $R_{1-3}$ and $R_{1-4}$; $R_{1-5}$ and $R_{1-6}$; $R_{1-7}$ and $R_{1-8}$; $R_{2-1}$ and $R_{2-2}$; $R_{2-3}$ and $R_{2-4}$; $R_{2-5}$ and $R_{2-6}$; and $R_{2-7}$ and $R_{2-8}$ with a nitrogen atom. Examples of such 5-membered ring include a pyrrolidine ring; examples of such 6-membered ring include a piperidine ring, morpholine ring and tetrahydropyrrolidine ring; and examples of such 7-membered ring include a cyclohexylamine ring.

The 5-membered ring, 6-membered ring and 7-membered ring containing the alkyl group, alkenyl group, alkynyl group, aralkyl group and nitrogen atom of $R_{1-1}$ to $R_{1-8}$ and $R_{2-1}$ to $R_{2-8}$ may have a further substituent. Examples of such a substituent include a halogen atom, methyl group, trifluoromethyl group, alkoxy group, hydroxyl group, acetoxy group, and carboxyl group.

For a colorant material according to the present invention, since organic solvents are used in mixing colorant compounds, an alkyl group having 2 to 5 carbon atoms is preferably used as $R_{1-1}$ to $R_{1-8}$ and $R_{2-1}$ to $R_{2-8}$ in terms of solubility in the organic solvent. A substituted or unsubstituted alkyl group having 4 carbon atoms is more preferably used as $R_{1-1}$ to $R_{1-8}$ and $R_{2-1}$ to $R_{2-8}$.

Five or six aromatic rings in the general formulas (1) and (2) may have 1 to 4 substituents. Examples of such substituent include a halogen atom such as a chloride atom and bromide atom; a lower alkyl group such as a methyl group, ethyl group, and n-propyl group; an alkoxy group such as a methoxy group and ethoxy group; a hydroxyl group; and a cyano group.

In the general formula (1), n may be either 1 or 2.

In the general formulas (1) and (2), $X_1^-$ and $X_2^-$ each represent an anion. Examples of such an anion include a chlorine ion, bromine ion, iodine ion, perchlorate ion, nitrate ion, benzenesulfonic acid ion, p-toluenesulfonic acid ion, methyl sulfate ion, ethyl sulfate ion, propyl sulfate ion, tetrafuloroborate ion, tetraphenylborate ion, hexafluorophosphate ion, benzenesulfinic chloride ion, acetate ion, trifluoroacetate ion, propionic acetate ion, benzoic acid ion, oxalic acid ion, succinic acid ion, malonic acid ion, oleic acid ion, stearic acid ion, citric acid ion, monohydrogen diphosphate ion and dihydrogen diphosphate ion, pentachlorostannate ion, chlorosulfonic acid ion, fluorosulfonic acid ion, trifluoromethane sulfonic acid ion, hexafluoro arsenic acid ion, hexafluoro antimonic acid ion, molybdic acid ion, tungstic acid ion, titanic acid ion, and zirconate ion.

The first colorant compounds represented by the general formulas (1) and (2) used in the present invention can be manufactured by a known method. To describe more specifically, compounds represented by the general formulas (1) and (2) can be obtained by conducting selective substitution of an amino compound obtained by the Ullmann reaction and reduction reaction by performing alkylation, alkenylation, aralkylation, or alkynylation, followed by subjecting the resultant compound to a silver halide oxidation reaction or electrolytic oxidation. In the case where a compound in which $R_{1-1}$ to $R_{1-8}$ and $R_{2-1}$ to $R_{2-8}$ differ from each other is obtained, the substitution reaction for a nitrogen atom must be performed in multiple stages.

The first colorant compounds represented by the general formulas (1) and (2) each have a maximum absorption wavelength within the near-infrared range of 900 to 1,400 nm and its molar extinction coefficient reaches from several tens of thousands to several hundreds of thousands. On the other hand, such first colorant compound rarely has absorption within the visible wavelength range. Therefore, if it is added to ink, it may not affect a coloring agent contained in the ink, more specifically, it may not produce a hue change and color fading. Note that the first colorant compound to be contained in a colorant material according to the present invention is not limited to one type. Two or more types of colorant compounds may be appropriately used in mixture.

It is effective for a first colorant compound as mentioned above to add in an amount in the range of 0.1 to 100% by mass based on a second colorant compound as described later. Preferably, the content of the first colorant compound is set within the range of 10 to 50% by mass to the second colorant compound. If the first colorant compound falls within this range, when the colorant material according to the present invention is used as a color material of ink, the first colorant compound cannot adversely affect the coloring property of the second colorant compound and therefore can improve the light fastness of an image formed of the ink while retaining sharpness of the hue.

The colorant material of the present invention comprises a first colorant compound represented by at least one of the general formulas (1) and (2) and a water-insoluble second colorant compound selected from the group consisting of a water insoluble triphenylmethane compound and a water insoluble xanthene compound. As such water insoluble triphenylmethane compound, one represented by the following general formula (3) is preferable. As such water insoluble xanthene compound, one represented by the general formula (4) is preferable.

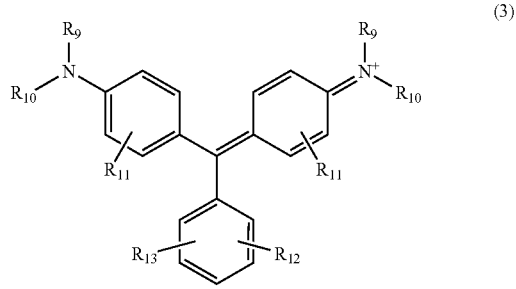

(3)

In the general formula (3), $R_9$ and $R_{10}$ each independently represent a hydrogen atom, an alkyl group having 1 to 5 carbon atoms, an aryl group, or an aralkyl group having no sulfonate group as a substituent; $R_{11}$ represents a hydrogen atom, halogen atom, alkyl group having 1 to 5 carbon atoms, or alkoxy group having 1 to 5 carbon atoms; $R_{12}$ and $R_{13}$ each independently represent a hydrogen atom, halogen atom, alkyl group, alkoxy group, hydroxyl group, amino group, carboxylate group, sulfonate group, carboxylic acid ester group, or carboxamide group. The alkyl group, alkoxy group, aralkyl group, aryl group, amino group, carboxylic acid ester group and carboxamide group of $R_9$ to $R_{13}$ may have substituents.

Examples of a substituent that an alkyl group of $R_9$ to $R_{13}$ may have, include a halogen atom, hydroxyl group, sulfonate group, carboxylate group, cyano group, and alkoxy group. Examples of a substituent that an aryl group and aralkyl group may have, include a halogen atom, alkyl group, and alkoxy group. Examples of a substituent that an amino group and carboxylic acid ester group may have, include an alkyl group, aralkyl group, and aryl group. Examples of a substituent that carboxamide group may have, include a hydroxyl group, alkyl group, aralkyl group, and aryl group.

Examples of an alkyl group having 1 to 5 carbon atoms of $R_9$ and $R_{10}$ include a methyl group, ethyl group, isopropyl group, n-propyl group, sec-butyl group, tert-butyl group, n-butyl group and pentyl group. Examples of an aryl group include a phenyl group and naphthyl group. Examples of an aralkyl group include a benzyl group and phenethyl group. In the $R_9$ and $R_{10}$, a hydrogen atom, methyl group, ethyl group and benzyl group are particularly preferable.

Examples of an alkyl group having 1 to 5 carbon atoms of $R_{11}$ include a methyl group, ethyl group, isopropyl group, n-propyl group, sec-propyl group, tert-butyl group, n-butyl group and pentyl group. Examples of an alkoxy group having 1 to 5 carbon atoms include a methoxy group, ethoxy group, propoxy group, and butoxy group. In the $R_{11}$, a hydrogen atom, an alkyl group having 1 to 5 carbon atoms, and a halogen atom are particularly preferable. Regarding the substitution position, the 2-position relative to a carbon atom binding to a phenyl group is preferable.

Examples of an alkyl group of $R_{12}$ and $R_{13}$ include a methyl group, ethyl group, isopropyl group, n-propyl group, sec-butyl group, tert-butyl group, n-butyl group and pentyl group. Examples of an alkoxy group include a methoxy group, ethoxy group, propoxy group and butoxy group. In these alkyl groups and alkoxy groups, the carbon number is preferably 1 to 5. Examples of an amino group include an unsubstituted amino group, N,N'-dimethyl amino group, N,N'-diethyl amino group, and N-benzyl-N-ethyl amino group. Examples of a carboxylic acid ester group include an alkyl ester group such as a methyl ester group and ethyl ester group; an aryl ester group such as a phenyl ester group and p-chlorophenyl ester group; and an aralkyl ester group such as a benzyl ester group. Examples of a carboxamide group include an unsubstituted carboxamide group; an N-alkyl carboxamide group such as an N-methyl carboxamide group and N-ethyl carboxamide group; an N-aryl carboxamide group such as an N-phenyl carboxamide group and N-(p-chlorophenyl)carboxamide group; and an N-hydroxyl carboxamide group. As a preferable combination of $R_{12}$ and $R_{13}$, one is a hydrogen atom and the other is a carboxylic acid ester group or carboxamide group. More preferably, the substitution position of each of these substituents is the 2-position relative to a carbon atom bonding to a phenyl group.

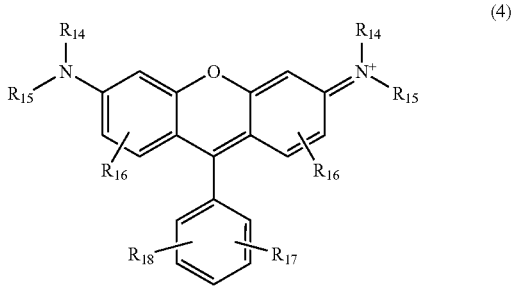
(4)

In the general formula (4) above, $R_{14}$ and $R_{15}$ each independently represent a hydrogen atom, an alkyl group having 1 to 5 carbon atoms, aryl group having no sulfonate group as a substituent, or aralkyl group; and $R_{16}$ represents a hydrogen atom, a halogen atom, an alkyl group having 1 to 5 carbon atoms or an alkoxy group having 1 to 5 carbon atoms. $R_{17}$ and $R_{18}$ each independently represent a hydrogen atom, halogen atom, alkyl group, alkoxy group, hydroxyl group, amino group, carboxylate group, sulfonate group, carboxylic acid ester, or carboxamide group. The alkyl group, alkoxy group, aralkyl group, aryl group, amino group, carboxylic acid ester, and carboxamide group of $R_{14}$ to $R_{18}$ may have a substituent.

Examples of a substituent that an alkyl group of $R_{14}$ to $R_{18}$ may have, include a halogen atom, hydroxyl group, sulfonate group, carboxylate group, cyano group, and alkoxy group. Examples of a substituent that an aryl group and aralkyl group may have, include a halogen atom, alkyl group, and alkoxy group. Examples of a substituent that an amino group and carboxylic acid ester may have, include an alkyl group, aralkyl group, and aryl group. Example of a substituent that a carboxamide group may have, include a hydroxyl group, alkyl group, aralkyl group and aryl group.

Examples of an alkyl group having 1 to 5 carbon atoms of $R_{14}$ and $R_{15}$ include a methyl group, ethyl group, isopropyl group, n-propyl group, sec-butyl group, tert-butyl group, n-butyl group and pentyl group. Examples of an aryl group include a phenyl group and naphthyl group. Examples of an aralkyl group include a benzyl group and phenethyl group. In $R_{14}$ and $R_{15}$, a hydrogen atom, alkyl group having 1 to 5 carbon atoms, 2,6-dialkylphenyl group and benzyl group are preferable.

Examples of an alkyl group having 1 to 5 carbon atoms of $R_{16}$ include a methyl group, ethyl group, isopropyl group, n-propyl group, sec-butyl group, tert-butyl group, n-butyl group and pentyl group. Examples of an alkoxy group having 1 to 5 carbon atoms include a methoxy group, ethoxy group, propoxy group, and butoxy group. In $R_{16}$, a hydrogen atom, an alkyl group having 1 to 5 carbon atoms, a halogen atom are particularly preferable, and a preferable substitution position is the 2-position relative to a carbon atom bonding to a phenyl group.

Examples of an alkyl group of $R_{17}$ and $R_{18}$ include a methyl group, ethyl group, isopropyl group, n-propyl group, sec-butyl group, tert-butyl group, n-butyl group and pentyl group. Examples of an alkoxy group include a methoxy group, ethoxy group, propoxy group, and butoxy group. In these alkyl groups and alkoxy groups, the number of carbon atoms is preferably 1 to 5. Examples of an amino group include an unsubstituted amino group; N,N-dimethyl amino group, N,N-diethyl amino group, and N-benzyl-N-ethyl amino group. Examples of a carboxylic acid ester group include an alkyl ester group such as a methyl ester group and ethyl ester group; an aryl ester group such as a phenyl ester group and p-chlorophenyl ester group; and an aralkyl ester group such as a benzyl ester group. Examples of a carboxamide group include an unsubstituted carboxamide group; an N-alkyl carboxamide group such as an N-methyl carboxamide group and N-ethyl carboxamide group; an N-aryl carboxamide group such as an N-phenyl carboxamide group and N-(p-chlorophenyl)carboxamide group; and an N-hydroxyl carboxamide group. As a preferable combination of $R_{17}$ and $R_{18}$, one is a hydrogen atom and the other is a carboxylic acid ester group or carboxamide group. More preferably, the substitution position of each of these substituents is the 2-position relative to a carbon atom bonding to a phenyl group.

The second colorant compound described above is characterized by being water-insoluble. The "water-insoluble" used herein means that the solubility of a compound in distilled water at 20° C. is 0.1% by mass or less. Examples of such second colorant compound to be used in a colorant material according to the present invention are not limited to those described above. When a colorant material according to the present invention is used in ink, it is preferable that the content of the second colorant compound in ink is appropriately set depending upon its purpose. More specifically, although the content of the second colorant compound in ink is determined depending upon the type of solvent and requisite properties for ink, it is preferably 0.5 to 15% by mass based on the total amount of ink and particularly preferably 1 to 7% by mass.

A colorant material according to the present invention may be a mixture in which a first colorant compound and a second colorant compound are dispersed and mixed microscopically or macroscopically, and more preferably, a mixture in which they are mixed in a molecular level as described above. Any method may be used for preparing such a colorant material as long as it can be provided in mixture form. As an example, there is a method comprising the steps of adding first and second colorant compounds to a common soluble solvent, dissolving them with sufficient stirring, if necessary, adding an appropriate binder, and applying the resultant solution onto a substrate by a coating method such as dip-coating, spray-coating, spinner-coating, bead-coating, wire bar coating, blade coating, roller coating, or gravure coating; or a deposition method such as vacuum deposition or sputtering. Other methods include a method of melting first and second colorant compounds, a method comprising steps of dissolving first and second colorant compounds in a common organic solvent capable dissolving both compounds, followed by evaporating the organic solvent, and a method comprising the steps of dissolving first and second colorant compounds in an organic solvent and pouring the resultant solution into a poor solvent hardly dissolving these colorant compounds to precipitate a desired compound.

It is further preferable that a colorant material according to the present invention is obtained in the form containing a polymer compound. This is because a more preferable dispersion ability can be obtained. As the polymer compound used herein, any resin may be used as long as it is hydrophilic. Particularly, such a polymer compound preferably has a weight average molecular weight of 1,000 to 30,000 and more preferably has 3,000 to 15,000. Examples of such a polymer compound include a block copolymer, random copolymer, graft copolymer or salt thereof composed of at least two monomers (at least one of them is hydrophilic monomer) selected from the group consisting of styrene, a styrene derivative, vinyl naphthalene, a vinyl naphthalene derivative, an aliphatic alcohol ester of α,β-ethylenically unsaturated carboxylic acid, acrylic acid, acrylic acid derivative, maleic acid, maleic acid derivative, itaconic acid, an itaconic acid derivative, fumaric acid, a fumaric acid derivative, vinyl acetate, vinyl pyrrolidine, acrylic amide, and its derivative. Alternatively, a natural resin such as rosin, shellac, and starch is preferably used. These resins are soluble in an organic solvent.

The content of a polymer compound as mentioned above is determined depending upon the types of first and second colorant materials, types of solvent components and requisite characteristics of ink. When a styrene-acrylic acid copolymer (acid value: 200) is used, the content of the copolymer is set preferably within the range of 0.1 to 100 parts by mass based on one part by mass of the second colorant compound and more preferably within the range of 0.5 to 5 parts by mass.

As a method of integrating a polymer compound into a colorant material of the present invention, any method can be used as long as it does not inhibit the effect of the present invention. For example, there are a method performed by using a disperser such as a sonicator, a sand mill, attritor, pearl mill, super mill, ball mill, impeller, disperser, KD mill, colloid mill, dynatron, three roll mill, and pressure kneader; and a method of binding both a colorant compound represented by at least one of the general formulas (1) and (2) and a second colorant compound to particles of a polymer compound or a method of coating them with the polymer compound.

A colorant material according to the present invention containing a polymer compound is prepared by first dissolving a polymer compound in an organic solvent, mixing, to this solution, a first colorant compound represented by at least one of the general formulas (1) and (2) and a second colorant compound selected from the compounds represented by at least one of the general formulas (3) and (4), sufficiently stirring the mixture to dissolve the colorant compounds for one hour, followed by removing the organic solvent under reduced pressure.

As the organic solvent to be used herein, any organic solvent can be used as long as it dissolves a first colorant compound represented by at least one of the general formulas (1) and (2), a second colorant compound, that is, at least one of a water insoluble triphenylmethane compound, which is a colorant compound represented by the general formula (3), and a water insoluble xanthene compound, which is a colorant compound represented by the general formula (4), and a polymer compound used as needed. Specific examples of a preferable organic solvent include dimethyl sulfoxide, dimethyl imidazolidinone, sulfolane, N-methylpyrrolidone, dimethylformamide, acetonitrile, acetone, dioxane, tetramethylurea, hexamethyl phosphoramide, hexamethylphosphorotriamide, pyridine, propionitrile, butanone, cyclohexanone, tetrahydrofuran, tetrahydropyran, ethylene glycol, diacetate, and γ-butyrolactone. Among them, dimethyl sulfoxide, N-methylpyrrolidone, dimethylformamide, dimethyl imidazolidinone, acetone and acetonitrile are particularly preferable. These solvents can be used singly or in combination of two or more elements. The content of such organic solvent is not particularly limited; however, it is preferably used in an amount of 2 to 500 parts by mass based on one part by mass of a second colorant compound, more preferably in an amount of 5 to 100 parts by mass.

Ink-jet ink using a colorant material according to the present invention described above will be now described. In the present invention, the colorant material can be dissolved or dispersed in aqueous mediums to make water dispersion. Such water dispersion can be used as ink. The aqueous medium to be used is preferably a solvent mixture of water and water-soluble organic solvent. As the water-soluble organic solvent to be used, it is more particularly preferable to use one having an effect of preventing ink from being dried. As the water, not general water containing various types of ions but deionized water is preferably used.

Specific examples of such water soluble organic solvent include alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethyl formamide and dimethylacetoamide, a ketone or ketone alcohol such as acetone and diacetone alcohol; ethers such as tetrahydrofuran and dioxane; a polyalkylene glycol such as polyethylene glycol and polypropylene glycol; alkylene glycols having an alkylene group of 2 to 6 carbon atoms, such as ethylene glycol, propylene glycol, butylene glycol, triethylene glycol, 1,2,6-hexanetriol, thiodiglycol, hexylene glycol, and diethylene glycol; a lower alkyl ether acetate such as polyethylene glycol monomethyl ether acetate; glycerin; lower alkyl ethers of a polyol such as ethylene glycol monomethyl (or ethyl) ether, diethylene glycol methyl (or ethyl) ether, and triethylene glycol monomethyl (or ethyl) ether; a polyol such as trimethylolpropane and trimethylolethane; N-methyl-2-pyrrolidone; 2-pyrrolidone; and 1,3-dimethyl-2-imidazolidinone.

These water-soluble organic solvents can be used singly or in admixture thereof. In consideration of keeping a moisture retention ability of ink, and improvement of solubility of a colorant material in ink, as well as the effective permeability of ink into recording paper, the content of such a water soluble organic solvent is set preferably within the range of 1 to 40% by mass of the total content of the ink, and more preferably within the range of 3 to 30% by mass. Furthermore, to attain a good solubility of a colorant material serving as a color material in ink, impart an appropriate viscosity to ink for attaining stable ejection, and prevent clogging of ink at a nozzle tip, the content of water in ink is preferably set within the range of 30 to 95% by mass.

To disperse a colorant material according to the present invention in aqueous mediums, a dispersant may be used. As such a dispersant, a chemically synthesized surfactant such as an ionic surfactant and a nonionic surfactant can be used. Besides this, a natural-produce-derived surfactant and a modified produce thereof modified with an enzyme or the like can be used. These dispersants can be used singly or in combination. The total content of dispersants is preferably set within the range of 0.5 to 20% by mass of the total content of ink for the purpose of maintaining good dispersion stability of a colorant material according to the present invention.

Furthermore, other than the components mentioned above, the ink-jet ink containing a colorant material according to the present invention may, if necessary, contain various additives such as a pH adjuster, defoaming agent, antiseptic agent, and antimicrobial agent in contents by which the effect of the present invention will not be inhibited, in order to give desired physical properties.

A colorant material according to the present invention can be used in an ink for an ink-jet printer. Besides this, it can be applied to various types of recording (writing) materials such as printing ink, paint, and handwriting ink. Furthermore, a colorant material according to the present invention is excellent in light absorption property and stability. Therefore, it is applicable to optical recording mediums and optical memory devices by applying onto the substrates thereof. Moreover, such a colorant material is applicable to coloring agents for color filters and display materials.

Now, a recording apparatus of the present invention will be described. As a recording apparatus suitable for recording by use of an ink of the present invention, mention is made of an apparatus in which ink droplets are ejected by applying thermal or dynamical energy corresponding to a recording signal to ink, which is contained in an ink container housed in a chamber of a recording head.

FIG. 1 shows an ink-jet recording apparatus having such a head integrated therein. In FIG. 1, reference numeral 61 indicates a blade serving as a wiping member. One of the ends of the blade is held by a blade-holding member and thereby fixed in the form of a cantilever. The blade 61 is arranged at a position adjacent to a recording region by the recording head. In the case shown in FIG. 1, the blade 61 is held so as to protrude into the track on which the recording head moves. Reference numeral 62 indicates a cap, which is arranged at a home position adjacent to the blade 61. The cap moves perpendicularly to the moving direction of the recording head and comes into contact with an ejection orifice surface to perform capping. Furthermore, reference numeral 63 of FIG. 1 indicates an ink absorber arranged adjacent to the blade 61. It is held so as to protrude into the track of the recording head in the same fashion as in the blade 61.

The blade 61, the cap 62 and the absorber 63 constitute a head recovering section 64, in which a moisture content, dust and dirt are removed by the blade 61 and the absorber 63 from the ink ejection orifice surface. Reference numeral 65 indicates a recording head, which has ejection-energy generation means and ejects ink to write on a recording medium facing the ejection orifice surface having an ejection orifice therein. Reference numeral 66 indicates a carriage having the recording head 65 mounted thereon, for moving the recording head 65. The carriage 66 is slidably engaged with a guide shaft 67 and partly connected to a belt 69 to be driven by a motor 68. With this mechanism, the carriage 66 can be moved along the guide shaft 67 and can reach the recording region by the recording head 65 and the region adjacent thereto.

Reference numeral 51 is a paper feed portion for feeding a recording medium. Reference numeral 52 is a paper feed roller to be driven by a motor (not shown). With this structural arrangement, a recording medium is fed to a position facing the ejection orifice surface of the recording head and discharged into a paper-discharge section to which a discharge roller 53 is arranged with the progression of printing.

In this structure, when the recording head 65 returns to the home position after recording is completed, the cap 62 of the head restoration section 64 has moved aside from the track of the recording head 65, whereas the blade 61 remains protruding into the track. As a result, the ejection orifice surface of the recording head 65 is wiped. Note that when the cap 62 comes into contact with the ejection orifice surface of the recording head 65 to perform capping, the cap 62 moves so as to protrude into the track of the recording head.

When the recording head 65 moves from the home position to a recording initiation position, the cap 62 and the blade 61 are placed in the same positions as those during wiping. As a result, the ejection orifice surface of the recording head 65 is also wiped during the movement of the head this time. The recording head moves toward the home position not only at recording termination time and restoration time but also during recording time. More specifically, while the recording head moves in the recording region for recording, it periodically moves to the home position adjacent to the recording region, at which it is wiped.

Figure 2:
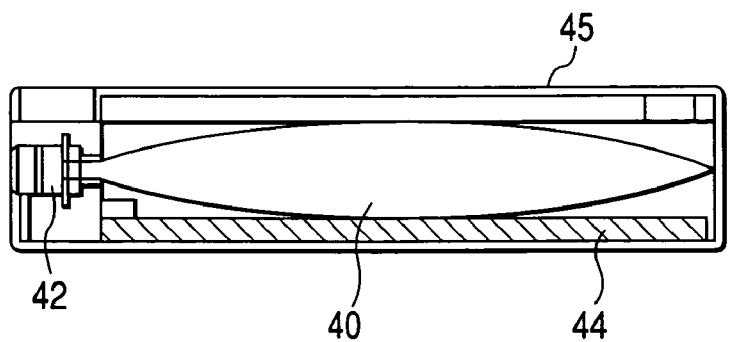
FIG. 2 is a longitudinal sectional view of an ink cartridge.

FIG. 2 is a sectional view of an ink cartridge 45 containing ink to be supplied to the head through an ink supply member, for example, a tube. Reference numeral 40 indicates an ink container containing a supply ink. The ink container is, for example, an ink pouch, which has a rubber tap 42 on the tip. By inserting a needle (not shown) through the tap 42, ink can be supplied to the head from the ink pouch 40. Reference numeral 44 indicates an ink absorber receiving waste ink.

Figure 3:
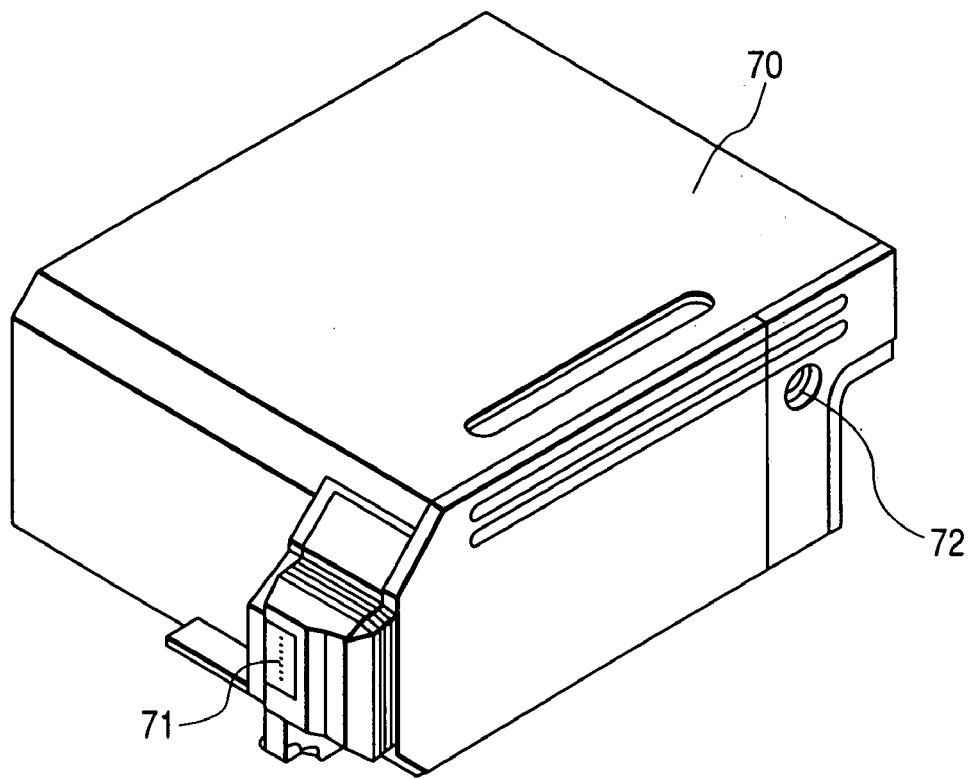
FIG. 3 is a perspective view of a recording unit.

The ink-jet recording apparatus to be used in the present invention is not limited to the aforementioned apparatus in which the head and the ink cartridge are discretely provided. It is suitable to use an apparatus as shown in FIG. 3 where the head and the ink cartridge are integrated into one body. In FIG. 3, reference numeral 70 indicates a recording unit, which houses an ink container containing ink, for example, ink absorber. Ink contained in the ink absorber is configured to be ejected from the head section 71 having a plurality of orifices in the form of ink droplets. Reference numeral 72 is an air hole through which air communicates between the recording unit and the air. The recording unit 70 is used in place of the recording head 65 shown in FIG. 1 and detachably provided to the carriage 66.

Figure 4:
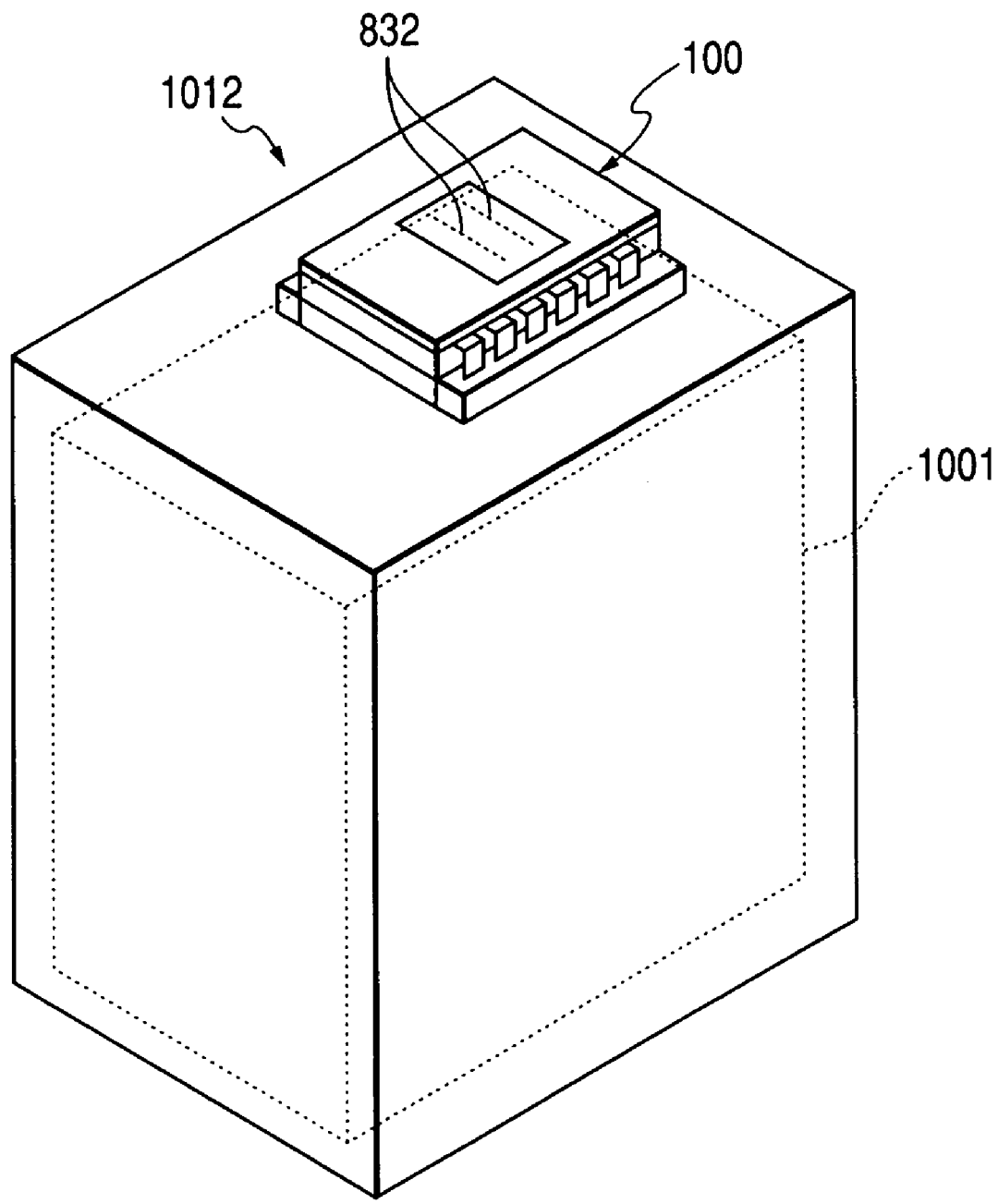
FIG. 4 is a schematic perspective view of an ink-jet cartridge equipped with a liquid ejection head.

FIG. 4 shows an ink-jet cartridge, which can be installed in an ink-jet recording apparatus as mentioned above. The cartridge 1012 used herein, which is for serial printing, is mainly constituted of an ink-jet recording head 100 and a liquid tank 1001 for containing a liquid such as ink. The ink-jet recording head 100 has numerous ejection orifices 832 for ejecting a liquid. The liquid such as ink is guided from the liquid tank 1001 to a common liquid chamber of the liquid ejection head 100 through a liquid supply channel (not shown). In the cartridge 1012 shown in FIG. 4, the ink-jet recording head 100 and the liquid tank 1001 are integrally formed into one body. A liquid can be supplied to the liquid tank 1001 as needed. The structure in which the liquid tank 1001 may be exchangeably connected to the liquid ejection head 100 can be employed.

EXAMPLES

The present invention will be described in detail by way of Examples and Comparative Examples, which should not be construed as limiting the present invention. It should be noted that the "%" and "part(s)" used herein are expressed on the basis of mass unless otherwise specified.

<Preparation Method 1 for Colorant Material>

Example 1

To 10.0 parts of a solution mixture containing dimethyl sulfoxide and deionized water in the ratio of 1:1, 0.2 parts of a compound represented by the following formula (5), which is the case where n=1, $R_{1-1}$ to $R_{1-8}$ all are a methoxyethyl group, and $X^-$ is a hexafluoroantimonic acid ion in the general formula (1), and 1.0 part of a xanthene compound represented by the following formula (6), which is included in the general formula (4), were added. These components were dissolved with sufficient stirring to obtain a water dispersion having a colorant material a composed of the two types of colorants dispersed in a water based dispersion liquid. The resultant water dispersion was designated as Ink liquid A.

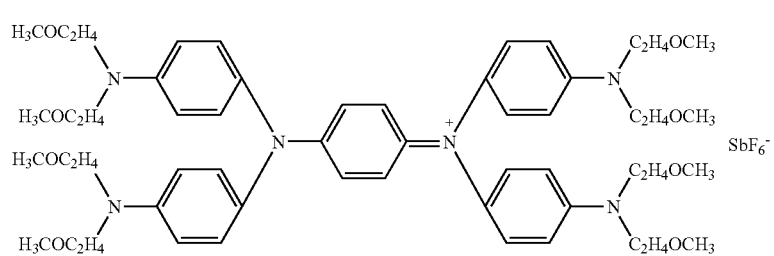

(5)

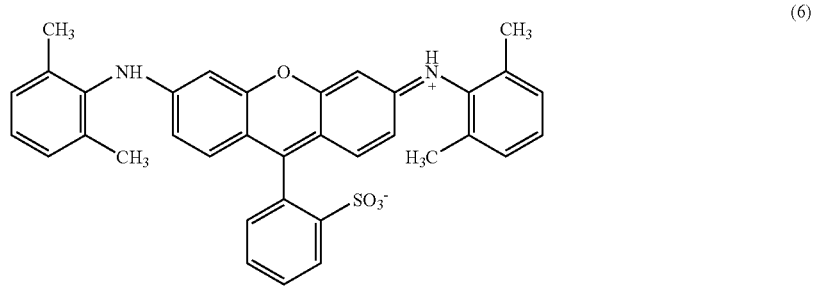

(6)

Example 2

A water dispersion having a colorant material b composed of two types of colorants dispersed in a water-based dispersion liquid was obtained in accordance with the same formulation as in Example 1 except that the compound used in Example 1 and represented by the formula (5) was replaced with a compound represented by the following formula (7), which is the case where $R_{1-1}$ to $R_{1-8}$ all are a n-butyl group and $X^-$ is a perchloric acid ion in the general formula (2) The resultant water dispersion was designated as Ink liquid B.

(7)

Example 3

A water dispersion having a colorant material c composed of two types of colorants dispersed in a water-based dispersion liquid was obtained in accordance with the same formulation as in Example 1 except that the compound used in Example 1 and represented by the formula (6) was replaced with a compound represented by the following formula (8), which is included in the general formula (3). The resultant water dispersion was designated as Ink liquid C.

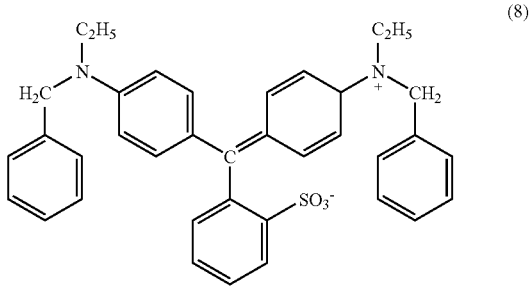

(8)

Example 4

A water dispersion having a colorant material d composed of two types of colorants dispersed in a water-based dispersion liquid was obtained in accordance with the same formulation as in Example 2 except that the compound used in Example 2 and represented by the formula (6) was replaced with a compound represented by the following formula (8), which is included in the general formula (3). The resultant water dispersion was designated as Ink liquid D.

<Preparation Method 2 for Colorant Material>

Example 5

As a polymer compound, 2 parts of a styrene-acrylic acid copolymer (acid value: 200, weight average molecular weight: 8,000) was dissolved in 100 parts of dimethyl sulfoxide. To this, 0.1 part of a compound represented by the formula (5) used in Example 1 and 1.0 part of a compound represented by the formula (6) used in Example 1 were added and dissolved with sufficient stirring. After the solution was stirred for one hour, an organic solvent was removed under vacuum to obtain a colorant material e composed of two types of colorants.

Example 6

A colorant material f composed of two types of colorants was obtained in accordance with the same formulation as in Example 5 except that the compound represented by the formula (5) and used in Example 5 was replaced with the compound represented by the formula (7) and used in Example 2.

Example 7

A colorant material g composed of two types of colorants was obtained in accordance with the same formulation as in Example 5 except that the compound represented by the formula (5) and used in Example 5 was replaced with the compound represented by the formula (9), which is the case where $R_{1-1}$ to $R_{1-8}$ all are a n-butyl group and $X^-$ is a hexafluoro arsenic acid ion in the general formula (2).

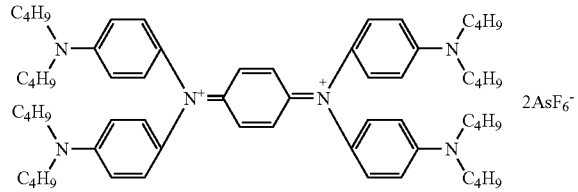

(9)

Example 8

A colorant material h composed of two types of colorants was obtained in accordance with the same formulation as in Example 6 except that the content of the compound represented by the formula (7) used in Example 6 was changed from 0.1 part to 0.2 parts.

Example 9

A colorant material i composed of two types of colorants was obtained in accordance with the same formulation as in Example 5 except that the compound represented by the formula (6) of Example 5 was replaced with the compound represented by the formula (8) used in Example 3.

Example 10

A colorant material j composed of two types of colorants was obtained in accordance with the same formulation as in Example 9 except that the compound represented by the formula (5) of Example 9 was replaced with the compound represented by the formula (7) used in Example 2.

<Preparation of Ink Liquids E to J Corresponding to that of Examples 5 to 10>

Colorant materials e to j obtained in Examples 5 to 10 and components according to Ink composition 1 shown in Table 1 were mixed, stirred, dissolved and filtrated under pressure by use of a 0.20 μm-filter. As a result, Ink liquids E to J corresponding to colorant materials e to j of Examples 5 to 10 were prepared.

TABLE 1

| Ink composition 1 (parts by mass) | | | | | | |
|---|---|---|---|---|---|---|
| | Ink liquid E | Ink liquid F | Ink liquid G | Ink liquid H | Ink liquid I | Ink liquid J |
| Glycerin | 5.0 | 5.0 | 5.0 | 5.0 | 5.0 | 5.0 |
| Urea | 5.0 | 5.0 | 5.0 | 5.0 | 5.0 | 5.0 |
| Diethylene glycol | 10.0 | 10.0 | 10.0 | 10.0 | 10.0 | 10.0 |
| Acetylenol | 0.3 | 0.3 | 0.3 | 0.3 | 0.3 | 0.3 |
| Ethanol | 5.0 | 5.0 | 5.0 | 5.0 | 5.0 | 5.0 |
| Colorant material Type | e | f | g | h | i | j |
| Colorant material Content | 6.2 | 6.2 | 6.2 | 6.4 | 6.2 | 6.2 |
| Deionized water | 68.5 | 68.5 | 68.5 | 68.3 | 68.5 | 68.5 |

Comparative Example 1

To 10 parts of deionized water, 0.2 parts of the compound used in Example 1 and represented by the formula (7), which is the case where $R_{1-1}$ to $R_{1-8}$ all are a n-butyl group and $X^-$ is a perchloride ion in the formula (1), and 1.0 part of C.I. Acid Red 289 were added. The resultant mixture was dissolved with sufficient stirring to obtain Ink liquid K. Note that C.I. Acid Red 289 is soluble in water.

Comparative Example 2

Ink liquid L was obtained in accordance with the same formulation as in Comparative Example 1 except that C.I. Acid Red 289 of Comparative Example 1 was replaced with C.I. Acid Blue 9. Note that C.I. Acid Blue 9 is soluble in water.

Comparative Example 3

Colorant material m containing only the compound used in Example 1 and represented by the formula (6) was obtained in accordance with the same formulation as in Example 6 except that the colorant compound used in Example 6 and represented by the formula (7) was not contained. Subsequently, colorant material m and components according to Ink composition 2 shown in Table 2 were mixed, stirred, dissolved and filtrated under pressure by use of a 0.20 μm-filter to obtain Ink liquid M.

Comparative Example 4

Colorant material n containing only the compound used in Example 9 and represented by the formula (8) was obtained in accordance with the same formulation as in Example 9 except that the colorant compound used in Example 9 and represented by the formula (5) was not contained. Subsequently, colorant material n and components according to Ink composition 2 shown in Table 2 were mixed, stirred, dissolved and filtrated under pressure by use of a 0.20 μm-filter to obtain Ink liquid N.

TABLE 2

| Ink composition 2 (parts by mass) | | |
|---|---|---|
| | Ink liquid M | Ink liquid N |
| Glycerin | 5.0 | 5.0 |
| Urea | 5.0 | 5.0 |
| Diethylene glycol | 10.0 | 10.0 |

TABLE 2-continued

Ink composition 2 (parts by mass)

|  |  | Ink liquid M | Ink liquid N |
|---|---|---|---|
| Acetylenol |  | 0.3 | 0.3 |
| Ethanol |  | 5.0 | 5.0 |
| Colorant | Type | m | n |
| material | Content | 6.0 | 6.0 |
| Deionized water |  | 68.7 | 68.7 |

Comparative Example 5

To 10 parts of deionized water, 1.0 part of C.I. Acid Red 289 was added and dissolved with sufficient stirring to obtain Ink liquid O.

Comparative Example 6

To 10 parts of deionized water, 1.0 part of C.I. Acid Blue 9 was added and dissolved with sufficient stirring to obtain Ink liquid P.

<Evaluation of Light Fastness of an Image>

Ink liquids A to D obtained in Examples and Ink K, L, O and P obtained in Comparative Examples were applied onto a professional photo paper (PR-101 paper) manufactured by Canon Inc. by a bar coater (No.3) in accordance with a bar coater method to obtain recorded materials. The resultant recorded materials were allowed to naturally dry for 24 hours. Furthermore, the Ink liquids E to J of Examples and Ink liquids M and N of Comparative Examples obtained above were separately charged in ink cartridges of a bubble jet (registered trademark) printer BJF930 manufactured by Canon Inc. Using the inkjet printer, 2 cm-square solid images were printed to obtain recorded materials. The resultant recorded materials were allowed to naturally dry for 24 hours.

The initial image density $OD_0$ of each of the recorded material was measured by a reflection density measurer (trade name: Spectrolino, manufactured by Gretag Macbeth). Furthermore, an image portion of the obtained recorded material was irradiated with xenon light (illuminance: 765 w/m², temperature: 50° C.) by use of a light fastness tester (trade name: Suntester XF-180 CPS manufactured by Shimadzu Corporation) for 50 hours. After the irradiation, the image density $OD_f$ of magenta of the recorded material was measured with respect to Ink liquids A, B, E to H, K, M and O and the image density $OD_f$ of cyan was measured with respect to the recorded materials of Ink liquids C, D, I, J, L, N and P. By fitting the obtained measurement values in the equation:

Residual density of color (%)=$(OD_f/OD_0) \times 100$, that is, by obtaining the ratio of reflection density before the xenon irradiation to that after xenon irradiation, the residual density of color was calculated. The obtained results are shown in Table 3 together with the constitution of the colorants used in each of the Ink liquids.

TABLE 3

Main components of ink and evaluation results

|  | Ink | Colorant contained | Polymer compound | Residual density of colorant (%) |
|---|---|---|---|---|
| Example 1 | A | Colorant a: compounds of formulas (5) and (6) | — | 53.1 |
| Example 2 | B | Colorant b: compounds of formulas (7) and (6) | — | 32.8 |
| Example 3 | C | Colorant c: compounds of formulas (5) and (8) | — | 22.6 |
| Example 4 | D | Colorant d: compounds of formulas (7) and (8) | — | 20.4 |
| Example 5 | E | Colorant e: compounds of formulas (5) and (6) | Contained | 55.9 |
| Example 6 | F | Colorant f: compounds of formula (7) and (6) | Contained | 51.8 |
| Example 7 | G | Colorant g: compounds of formulas (9) and (6) | Contained | 68.1 |
| Example 8 | H | Colorant h: compounds of formula (7) and (6) | Contained | 67.7 |
| Example 9 | I | Colorant i: compounds of formulas (5) and (8) | Contained | 48.2 |
| Example 10 | J | Colorant j: compounds of formulas (7) and (8) | Contained | 56.5 |
| Comparative Example 1 | K | Compound of formula (7) + C.I. Acid Red 289 | — | 22.3 |
| Comparative Example 2 | L | Compound of formula (7) + C.I. Acid Blue 9 | — | 9.8 |
| Comparative Example 3 | M | Colorant m: compound of formula (6) | Contained | 13.5 |
| Comparative Example 4 | N | Colorant n: compound of formula (8) | Contained | 6.2 |
| Comparative Example 5 | O | C.I. Acid Red 289 | — | 17.1 |
| Comparative Example 6 | P | C.I. Acid Blue 9 | — | 6.1 |

From the results shown in Table 3, the following facts were confirmed. More specifically, the test results of Ink liquid A according to Example 1, Ink liquid B according to Example 2, Ink liquid K according to Comparative Example 1, and Ink liquid O according to Comparative Example 5 were compared. As a result, with respect to the magenta ink, in the case where a compound represented by the formula (5) included in the general formula (1) and a compound represented by the formula (7) included in the general formula (2) were contained together with the other colorant compound, the light fastness of the obtained image was found to be improved. Furthermore, when test results of Ink liquid B and Ink liquid K were compared, Ink liquid B where a second colorant compound represented by the formula (6) was used as the other colorant compound used together with a compound represented by the formula (7), was found to have a higher effect in view of compatibility between the colorant compounds.

Similarly, the test results of Ink liquids C and D of Examples and those of Ink liquids L and P of Comparative Examples were compared. As a result, with respect to the cyan ink, in the case where a compound represented by the formula (5) included in the general formula (1) and a compound represented by the formula (7) included in the general formula (2) were contained together with the other colorant compound, the light fastness of the obtained image was found to be improved. Furthermore, when the test results of Ink liquids D and L were compared, Ink liquid D where a second colorant compound represented by the formula (8) was used as the colorant compound used together with a compound represented by formula (7) was found to have a higher effect in view of compatibility between the colorant compounds.

The test results of Ink liquids E, F or G of Examples were compared to those of Ink liquid M of Comparative Example. As a result, also with respect to other magenta ink, in the case where a compound represented by the formula (5) included in the general formula (1) and compounds represented respectively by the formulas (7) and (9) included in the general formula (2) were contained together with the other colorant compound, the light fastness of the obtained images were found to be improved. Furthermore, when the test results of Ink liquid F and Ink liquid H of Examples were compared, the case where the content of a compound represented by the formula (7) was larger, the light fastness of the image was found to be improved more effectively.

From the results above, it was demonstrated that a first colorant compound represented by at least one of the general formulas (1) and (2) has a good compatibility with a second colorant compound which is at least one of a water insoluble triphenylmethane compound and a water insoluble xanthene compound. When they are contained together, since the first colorant compound and the second colorant compound can be present in the proximity of each other, the fastness of the second colorant compound can be conceivably improved.

A colorant material according to the present invention can be applied to not only an ink for an ink-jet printer but also various recording materials such as printing ink, paint, writing ink, coloring agent for color filter, recording layer of an optical recording medium. A colorant material according to the present invention contains a colorant compound having a maximum absorption wavelength in the range of 900 to 1400 nm. Therefore, it can efficiently prevent the light within such wavelength region and thus applicable to an infrared block film and sunglasses.

This application claims priority from Japanese Patent Application No. 2004-055256 filed on Feb. 27, 2004, which is hereby incorporated by reference herein.

What is claimed is:

1. A water dispersion comprising at least one colorant material, the at least one colorant material comprising:
a compound represented by at least one of the following general formulas (1) and (2) as a first colorant compound and at least one of a water insoluble triphenylmethane compound and a water insoluble xanthene compound as a second colorant compound:

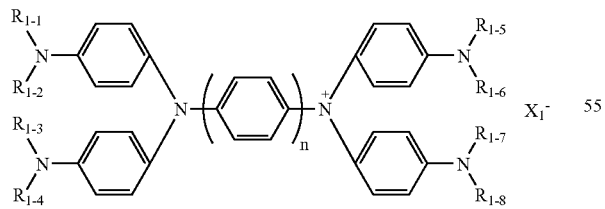

wherein $R_{1-1}$ to $R_{1-8}$ each represent a hydrogen atom, an alkyl group having 1 to 8 carbon atoms, an alkenyl group having 1 to 8 carbon atoms, an alkynyl group having 1 to 8 carbon atoms, or an aralkyl group; or, of $R_{1-1}$ to $R_{1-8}$, two groups attaching to the same nitrogen atom may bond to each other to form a 5-membered ring, 6-membered ring or 7-membered ring together with the nitrogen atom and wherein $R_{1-1}$ to $R_{1-8}$ may have substituents; and $R_{1-1}$ to $R_{1-8}$ and their substituents may be the same or different; any aromatic ring in the formula may have a further substituent; n is 1 or 2; and $X_1^-$ represents an anion; and

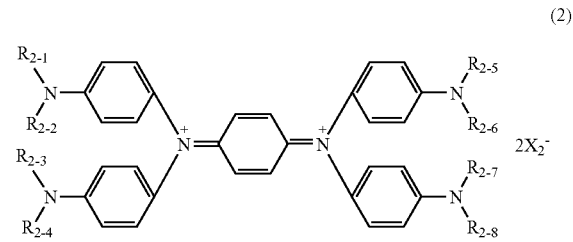

wherein $R_{2-1}$ to $R_{2-8}$ each represent a hydrogen atom, an alkyl group having 1 to 8 carbon atoms, an alkenyl group having 1 to 8 carbon atoms, an alkynyl group having 1 to 8 carbon atoms, or an aralkyl group; or, of $R_{2-1}$ to $R_{2-8}$, two groups attaching to the same nitrogen atom may bond to each other to form a 5-membered ring, 6-membered ring or 7-membered ring together with the nitrogen atom and wherein $R_{2-1}$ to $R_{2-8}$ may have substituents; and $R_{2-1}$ to $R_{2-8}$ and their substituents may be the same or different; any aromatic ring in the formula may have a further substituent; and $X_2^-$ represents an anion; and wherein the second colorant compound is a water insoluble triphenylmethane compound represented by the following general formula (3) or a water insoluble xanthene compound represented by the following general formula (4):

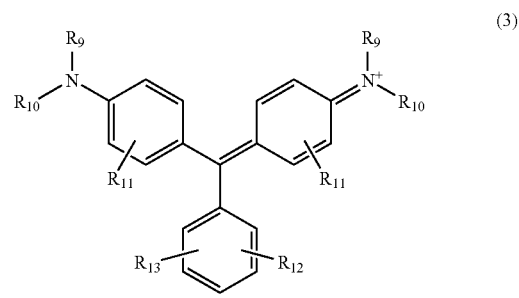

wherein $R_9$ and $R_{10}$ each independently represent a hydrogen atom, an alkyl group having 1 to 5 carbon atoms, an aryl group, or an aralkyl group having no sulfonate group as a substituent; $R_{11}$ represents a hydrogen atom, halogen atom, alkyl group having 1 to 5 carbon atoms, or alkoxy group having 1 to 5 carbon atoms; $R_{12}$ and $R_{13}$ each independently represent a hydrogen atom, halogen atom, alkyl group, alkoxy group, hydroxyl group, amino group, carboxylate group, sulfonate group, carboxylic acid ester group, or carboxamide group, provided that the alkyl group, alkoxy group, aralkyl group, aryl group, amino group, carboxylic acid ester group and carboxamide group of $R_9$ to $R_{13}$ may have substituents;

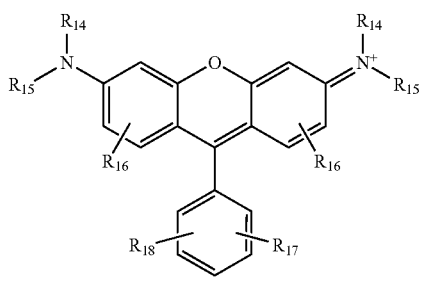

wherein $R_{14}$ and $R_{15}$ each independently represent a hydrogen atom, an alkyl group having 1 to 5 carbon atoms, aryl group having no sulfonate group as a substituent, or aralkyl group; $R_{16}$ represents a hydrogen atom, a halogen atom, an alkyl group having 1 to 5 carbon atoms or an alkoxy group having 1 to 5 carbon atoms; $R_{17}$ and $R_{18}$ each independently represent a hydrogen atom, halogen atom, alkyl group, alkoxy group, hydroxyl group, amino group, carboxylate group, sulfonate group, carboxylic acid ester, or carboxamide group, provided that the alkyl group, alkoxy group, aralkyl group, aryl group, amino group, carboxylic acid ester, and carboxamide group of $R_{14}$ to $R_{18}$ may have a substituent.

2. The water dispersion according to claim 1, wherein the content of the first colorant compound is 0.1 to 100% by mass based on the second colorant compound.

3. The water dispersion according to claim 1, wherein the first colorant compound is one represented by the general formula (1).

4. The water dispersion according to claim 1, wherein the first colorant compound is one represented by the general formula (2).

5. The water dispersion according to claim 1, wherein the colorant material further comprises a polymer compound.

6. An ink comprising an aqueous medium and a color material, wherein the color material is a colorant material comprising a compound represented by at least one of the following general formulas (1) and (2) as a first colorant compound and at least one of a water insoluble triphenylmethane compound and a water insoluble xanthene compound as a second colorant compound,

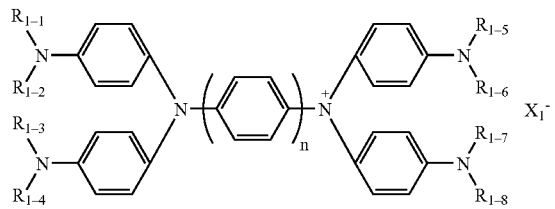

wherein $R_{1-1}$ to $R_{1-8}$ each represent a hydrogen atom, an alkyl group having 1 to 8 carbon atoms, an alkenyl group having 1 to 8 carbon atoms, an alkynyl group having 1 to 8 carbon atoms, or an aralkyl group; or, of $R_{1-1}$ to $R_{1-8}$, two groups attaching to the same nitrogen atom may bond to each other to form a 5-membered ring, 6-membered ring or 7-membered ring together with the nitrogen atom and wherein $R_{1-1}$ to $R_{1-8}$ may have substituents; and $R_{1-1}$ to $R_{1-8}$ and their substituents may be the same or different; any aromatic ring in the formula may have a further substituent; n is 1 or 2; and $X_1^-$ represents an anion; and

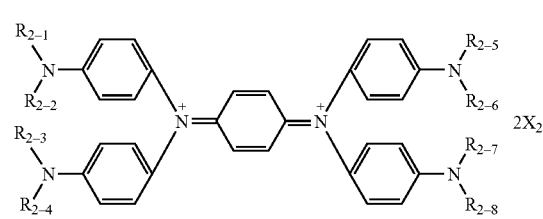

wherein $R_{2-1}$ to $R_{2-8}$ each represent a hydrogen atom, an alkyl group having 1 to 8 carbon atoms, an alkenyl group having 1 to 8 carbon atoms, an alkynyl group having 1 to 8 carbon atoms, or an aralkyl group; or, of $R_{2-1}$ to $R_{2-8}$, two groups attaching to the same nitrogen atom may bond to each other to form a 5-membered ring, 6-membered ring or 7-membered ring together with the nitrogen atom and wherein $R_{2-1}$ to $R_{2-8}$ may have substituents; and $R_{2-1}$ to $R_{2-8}$ and their substituents may be the same or different; any aromatic ring in the formula may have a further substituent; and $X_2^-$ represents an anion; and wherein the second colorant compound is a water insoluble triphenylmethane compound represented by the following general formula (3) or a water insoluble xanthene compound represented by the following general formula (4):

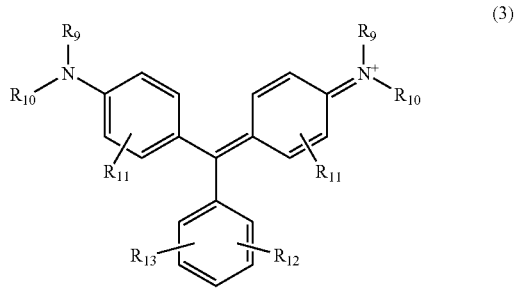

wherein $R_9$ and $R_{10}$ each independently represent a hydrogen atom, an alkyl group having 1 to 5 carbon atoms, an aryl group, or an aralkyl group having no sulfonate group as a substituent; $R_{1-1}$ represents a hydrogen atom, halogen atom, alkyl group having 1 to 5 carbon atoms, or alkoxy group having 1 to 5 carbon atoms; R12 and R13 each independently represent a hydrogen atom, halogen atom, alkyl group, alkoxy group, hydroxyl group, amino group, carboxylate group, sulfonate group, carboxylic acid ester group, or carboxamide group, provided that the alkyl group, alkoxy group, aralkyl group, aryl group, amino group, carboxylic acid ester group and carboxamide group of $R_9$ to $R_{13}$ may have substituents;

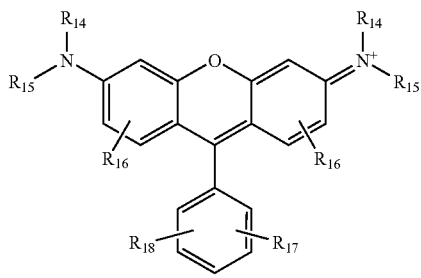

(4)

wherein $R_{14}$ and $R_{15}$ each independently represent a hydrogen atom, an alkyl group having 1 to 5 carbon atoms, aryl group having no sulfonate group as a substituent, or aralkyl group; $R_{16}$ represents a hydrogen atom, a halogen atom, an alkyl group having 1 to 5 carbon atoms or an alkoxy group having 1 to 5 carbon atoms; $R_{17}$ and $R_{18}$ each independently represent a hydrogen atom, halogen atom, alkyl group, alkoxy group, hydroxyl group, amino group, carboxylate group, sulfonate group, carboxylic acid ester, or carboxamide group, provided that the alkyl group, alkoxy group, aralkyl group, aryl group, amino group, carboxylic acid ester, and carboxamide group of $R_{14}$ to $R_{18}$ may have a substituent.

7. The ink according to claim 6, wherein the content of the first colorant compound is 0.1 to 100% by mass based on the second colorant compound.

8. The ink according to claim 6, wherein the first colorant compound is one represented by the general formula (1).

9. The ink according to claim 6, wherein the first colorant compound is one represented by the general formula (2).

10. The ink according to claim 6, further comprising a polymer compound.

11. An ink tank comprising an ink containing section storing the ink according to claim 6.

12. A recording unit comprising an ink containing section storing the ink according to claim 6 and a head section for ejecting droplets of the ink.

13. An ink-jet recording apparatus comprising the ink according to claim 6, and an ink-jet recording head for ejecting the ink.

14. An ink-jet recording method comprising a step of ejecting the ink according to claim 6 onto a recording medium by an ink-jet method.

* * * * *

UNITED STATES PATENT AND TRADEMARK OFFICE
CERTIFICATE OF CORRECTION

PATENT NO.        : 7,303,615 B2
APPLICATION NO. : 11/063592
DATED             : December 4, 2007
INVENTOR(S)       : Yuko Yamagishi et al.

It is certified that error appears in the above-identified patent and that said Letters Patent is hereby corrected as shown below:

COLUMN 1:
Line 17, "life style" should read --lifestyle--.

COLUMN 4:
Line 45, "stituent" should read --stituents--.

COLUMN 7:
Line 35, "Example" should read --Examples--.

COLUMN 8:
Line 49, "capable" should read --capable of--.

COLUMN 13:
Line 37, "formula (2)" should read --formula (2).--.
Line 47,

"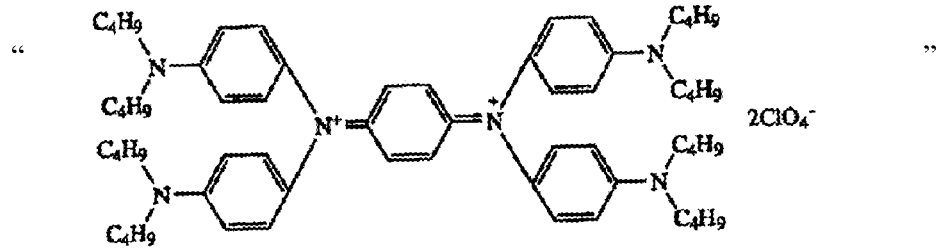"

should read

--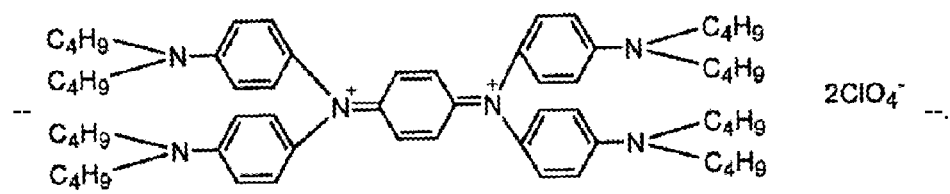--.

UNITED STATES PATENT AND TRADEMARK OFFICE
CERTIFICATE OF CORRECTION

PATENT NO. : 7,303,615 B2
APPLICATION NO. : 11/063592
DATED : December 4, 2007
INVENTOR(S) : Yuko Yamagishi et al.

It is certified that error appears in the above-identified patent and that said Letters Patent is hereby corrected as shown below:

COLUMN 20:
Line 46,

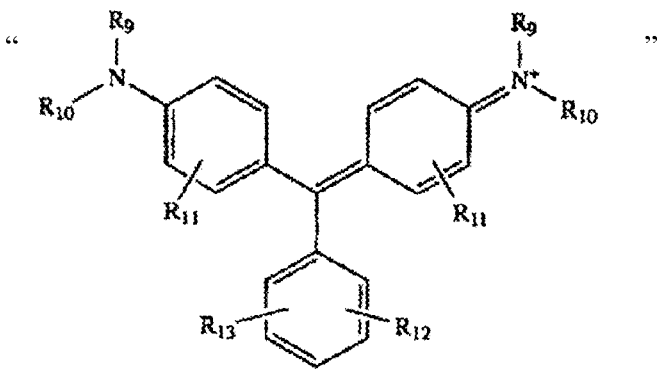

should read

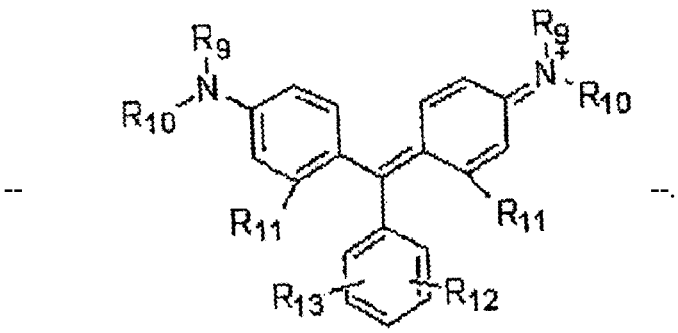

UNITED STATES PATENT AND TRADEMARK OFFICE
CERTIFICATE OF CORRECTION

PATENT NO.        : 7,303,615 B2
APPLICATION NO.   : 11/063592
DATED             : December 4, 2007
INVENTOR(S)       : Yuko Yamagishi et al.

It is certified that error appears in the above-identified patent and that said Letters Patent is hereby corrected as shown below:

COLUMN 22:
Line 46,

" 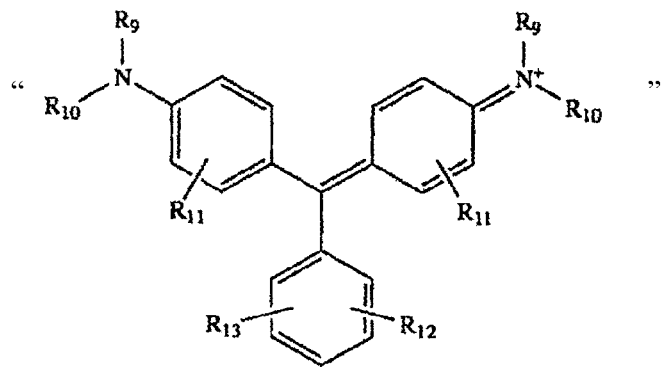 "

should read

-- 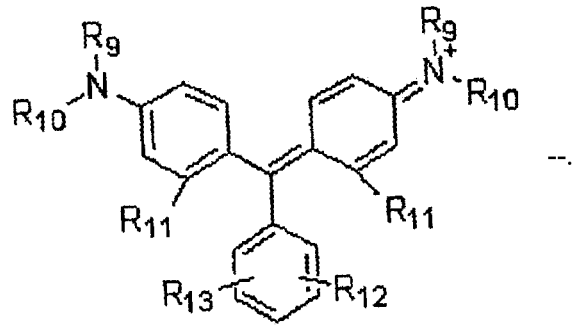 --.

UNITED STATES PATENT AND TRADEMARK OFFICE
CERTIFICATE OF CORRECTION

PATENT NO. : 7,303,615 B2
APPLICATION NO. : 11/063592
DATED : December 4, 2007
INVENTOR(S) : Yuko Yamagishi et al.

It is certified that error appears in the above-identified patent and that said Letters Patent is hereby corrected as shown below:

COLUMN 22, cont'd:
Line 58, "$R_{1-1}$" should read --$R_{11}$--.
Line 61, "R12 and R13" should read --$R_{12}$ and $R_{13}$--.

Signed and Sealed this

Ninth Day of December, 2008

JON W. DUDAS
*Director of the United States Patent and Trademark Office*